(12) United States Patent
Wloka et al.

(10) Patent No.: US 11,585,303 B2
(45) Date of Patent: *Feb. 21, 2023

(54) DUAL-FUEL INTERNAL COMBUSTION ENGINE

(71) Applicant: MAN Energy Solutions SE, Augsburg (DE)

(72) Inventors: Johann Wloka, Munich (DE); Ludwig Maier, Diedorf (DE); Thomas Klaua, Augsburg (DE)

(73) Assignee: MAN ENERGY SOLUTIONS SE, Augsburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/357,318

(22) Filed: Jun. 24, 2021

(65) Prior Publication Data

US 2021/0404427 A1    Dec. 30, 2021

(30) Foreign Application Priority Data

Jun. 25, 2020   (DE) .................... 10 2020 116 710.5

(51) Int. Cl.
*F02M 37/00* (2006.01)
*F02M 43/02* (2006.01)
*F02M 43/04* (2006.01)

(52) U.S. Cl.
CPC .... *F02M 37/0064* (2013.01); *F02M 37/0029* (2013.01); *F02M 43/02* (2013.01); *F02M 43/04* (2013.01)

(58) Field of Classification Search
CPC ............ F02D 19/0642; F02D 19/0647; F02D 19/0692; F02D 41/0025
See application file for complete search history.

(56) References Cited

U.S. PATENT DOCUMENTS

| 6,067,964 A | * | 5/2000 | Ruoff | ................... F02M 47/027 |
| | | | | 123/585 |
| 2010/0199948 A1 | * | 8/2010 | Rogak | ................. F02D 19/0689 |
| | | | | 123/304 |

(Continued)

FOREIGN PATENT DOCUMENTS

| DE | 102014016927 B3 | 5/2016 |
| DE | 102015203607 | 9/2016 |

(Continued)

OTHER PUBLICATIONS

Search Report dated Dec. 3, 2021 issued in European Patent Application No. 21181609.5.

(Continued)

*Primary Examiner* — John Kwon
(74) *Attorney, Agent, or Firm* — Cozen O'Connor

(57) ABSTRACT

A dual-fuel internal combustion engine includes: cylinders for combusting a first liquid fuel having a first ignitability in a first operating mode, and a second liquid fuel having a second lesser ignitability, in a second operating mode; a main injection system including a main injector for each cylinder, for feeding the first liquid fuel to the respective cylinders in the first operating mode and for feeding the second liquid fuel to the respective cylinders in the second operating mode; and a pilot injection system including a pilot injector for each cylinder, via which the first liquid fuel can is feedable to the respective cylinders in the second operating mode for igniting the second liquid fuel. The main and pilot injection systems are coupled such that in the second operating mode the first liquid fuel, is feedable to the respective main injector as a working fluid and/or a barrier fluid.

11 Claims, 2 Drawing Sheets

(56) References Cited

U.S. PATENT DOCUMENTS

| | | | | |
|---|---|---|---|---|
| 2014/0373806 A1* | 12/2014 | Hou | ............ | F02M 59/105 |
| | | | | 123/294 |
| 2015/0144710 A1* | 5/2015 | Graham | ............ | F02M 63/0014 |
| | | | | 239/584 |
| 2016/0123286 A1* | 5/2016 | Hou | ............ | F02M 45/086 |
| | | | | 123/304 |

FOREIGN PATENT DOCUMENTS

| | | |
|---|---|---|
| DE | 10 2017 123 315 | 10/2017 |
| EP | 2783095 | 9/2020 |
| JP | 2006-144750 | 6/2008 |
| WO | WO 2017/162902 | 9/2017 |

OTHER PUBLICATIONS

Office Action dated Feb. 22, 2021 issued in German Patent Application No. 102020116710.5.

* cited by examiner

DUAL-FUEL INTERNAL COMBUSTION ENGINE

BACKGROUND OF THE INVENTION

1. Field of the Invention

The invention relates to a dual-fuel internal combustion engine and in particular to the field of so-called large engines or large internal combustion engines, whose cylinders have piston diameters of at least 140 mm, in particular of at least 175 mm. Such large internal combustion engines are for example marine engines.

2. Description of the Related Art

Dual-fuel internal combustion engines as marine engines are already known. Dual-fuel internal combustion engines known from practice can be operated in a first operating mode in which a liquid fuel is combusted, and in a second operating mode, in which there is combusted a gaseous fuel or another liquid fuel.

From DE 10 2017 123 315 A1 a dual-fuel internal combustion engine having a dual-fuel injector is known. Each fuel is delivered in the direction of the dual-fuel injector via a separate fuel pump. Furthermore, there is a separate sealing and lubricating oil system.

There is a need for a new type of dual-fuel internal combustion engine with a simple structure.

SUMMARY OF THE INVENTION

Starting out from this, it is an object of the present invention on to create a new type of dual-fuel internal combustion engine.

This object may be solved through a dual-fuel internal combustion engine that comprises cylinders in which in a first operating mode a first liquid fuel and in a second operating mode a second liquid fuel are combustible. The dual-fuel internal combustion engine comprises a main injection system which comprises at least one main injector for each cylinder, wherein via the main injection system the first liquid fuel, which is relatively ignitable, can be fed to the cylinders in the first operating mode, and wherein via the main injection system the second liquid fuel, which is relatively hardly ignitable, can be fed to the cylinders in the second operating mode. The dual-fuel internal combustion engine comprises a pilot injection system which, for each cylinder, comprises at least one pilot injector, wherein via the pilot injection system in the second operating mode the first liquid fuel can be fed to the cylinders of the internal combustion engine for igniting the second liquid fuel. The main injection system and the pilot injection system of the dual-fuel internal combustion engine according to an aspect of the invention are coupled such that in the second operating mode, emanating from the pilot injection system, the first liquid fuel can be fed to the respective main injector of the main injection system as working fluid and/or as barrier fluid.

Accordingly, the two injection systems are coupled to one another. This is effected such that in the second operating mode, emanating from the pilot injection system, the first liquid fuel can be fed to the respective main injector of the main injection system, via which, in the second operating mode, the second liquid fuel is introduced into the cylinders, wherein the first liquid fuel in the process serves as working fluid and/or barrier fluid in the respective main injector. Such a working fluid or barrier fluid serves for sealing or actuating valves of the respective main injector.

In the dual-fuel internal combustion engine according to the aspect of the invention, a liquid fuel each is combusted in both operating modes. The first liquid fuel for the first operating mode is relatively highly ignitable. The second liquid fuel for the second operating mode is relatively less ignitable. The first liquid fuel ignites the second liquid fuel in the second operating mode. The dual-fuel internal combustion engine comprises the main injection system, which, for each cylinder, comprises at least one main injector, and the pilot injection system, which for each cylinder comprises at least one pilot injector. By way of the main injection system, the first liquid fuel can be fed to the cylinders in the first operating mode and the second liquid fuel in the second operating mode. In the second operating mode, the first liquid fuel assumes two functions, firstly the function of igniting the second fuel and secondly the function of the working fluid and/or barrier fluid in the region of the respective main injector. The main injection system is coupled to the pilot injection system in order to utilize the ignition fluid also as working fluid and/or barrier fluid.

According to a further development of the invention, a respective branch line branches off the pilot injection system downstream of the respective pilot injector and preferentially opens into the main injection system in the region of the respective main injector of the main injection system. In the second operating mode, a pressure in the respective branch line leading from the pilot injection system to the main injection system is greater than a pressure in the region of the respective main injector of the main injection system. Such a coupling of the two injection systems via the respective branch line is particularly preferred. Accordingly, the first fuel, which in the region of the respective main injector serves as working fluid and/or barrier fluid, can be simply fed from the pilot injection system to the main injection system in the second operating mode.

According to a further development of the invention, a pressure reducer is integrated in the respective branch line in order to limit the pressure in the respective branch line. The pressure in the respective branch line is limited via the pressure reducer.

According to a further development of the invention, the main injection system comprises a main pump via which the first liquid fuel can be fed to the cylinders in the first operating mode, and via which in the second operating mode the second liquid fuel can be fed to the cylinders. The pilot injection system comprises a pilot pump via which, in the second operating mode, the first liquid fuel for igniting the second liquid fuel can be fed to the cylinders. A first fuel tank for the first fuel can be coupled to the main pump via a first fuel line. A second fuel tank for the second fuel can be coupled to the main pump via a second fuel line. A shuttle valve serves for coupling the main pump to the first fuel tank via the first fuel line in the first operating mode and the main pump to the second fuel tank via the second fuel line in the second operating mode. This further development of the invention ensures a particularly simple structure of the dual-fuel internal combustion engine according to the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred further developments of the invention are obtained from the subclaims and the following description. Exemplary embodiments of the invention are explained in more detail by way of the drawings without being restricted to this. In the drawings

DETAILED DESCRIPTION OF THE PRESENTLY PREFERRED EMBODIMENTS

Figure 1:
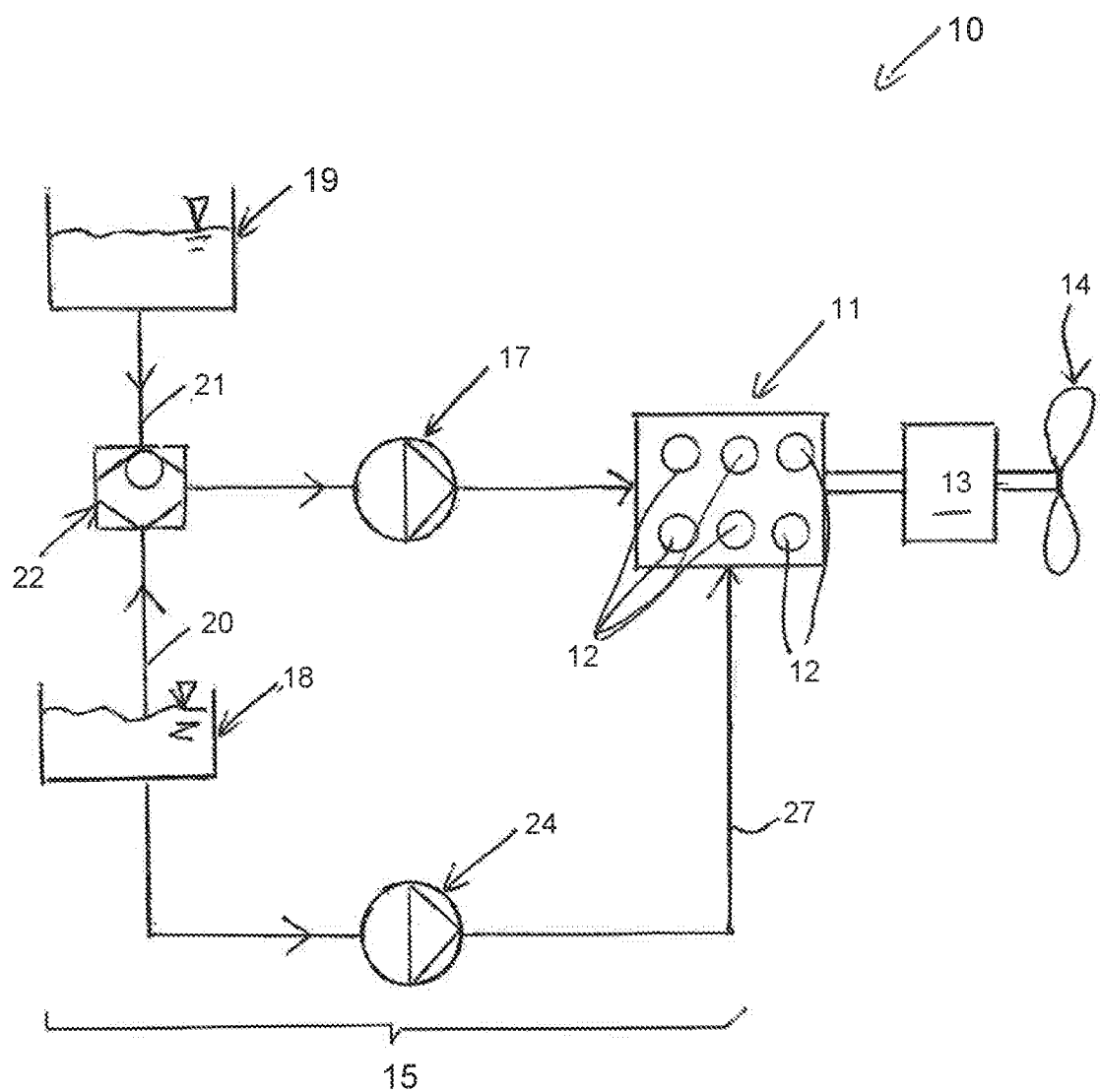
FIG. 1: is a diagram of a ship propulsion system with a dual-fuel internal combustion engine.

FIG. 1 is a highly schematic view of a ship propulsion system 10, which comprises a dual-fuel internal combustion engine 11 with multiple cylinders 12. Fuel is combusted in the cylinders 12, namely in a first operating mode of the dual-fuel internal combustion engine a first liquid fuel and in a second operating mode of the dual-fuel internal combustion engine a second liquid fuel.

During the combustion of the respective fuel the dual-fuel internal combustion engine generates a drive power which is utilized in FIG. 1 in order to drive a generator 13. In the generator 13, electric energy is generated which drives a ship propeller 14.

Figure 2:
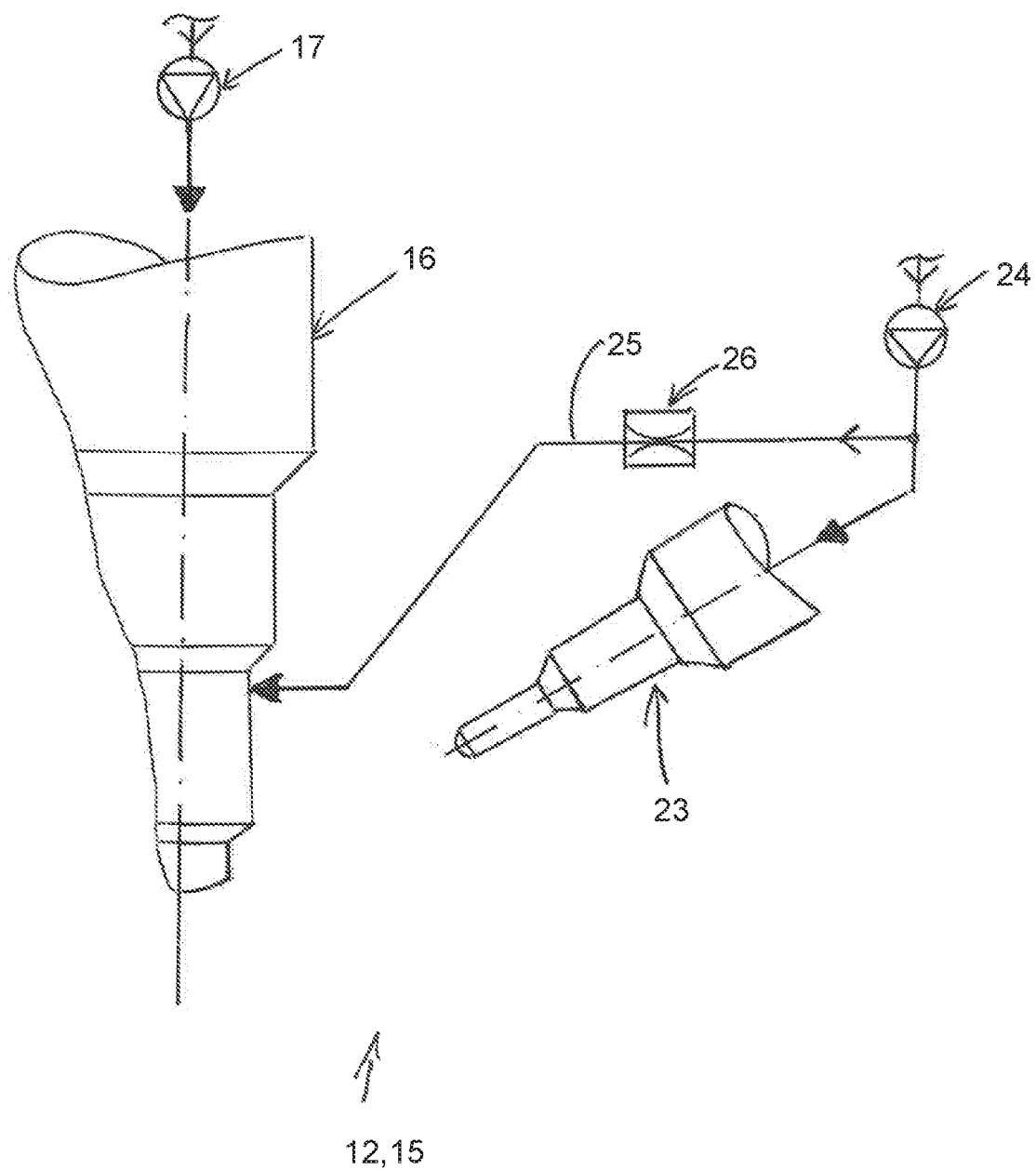
FIG. 2: is an extract from the dual-fuel internal combustion engine in the region of a cylinder.

FIG. 1, furthermore, shows a fuel supply system 15 of the dual-fuel internal combustion engine 11. FIG. 2 shows further assemblies of the fuel supply system 15. By way of the fuel supply system 15, the respective liquid fuel can be fed to the cylinders 12 of the dual-fuel internal combustion engine 11 in the respective operating mode of the same. The fuel supply system 15 of the dual-fuel internal combustion engine 11 comprises a main injection system and a pilot injection system.

By way of the main injection system, which for each cylinder 12 comprises at least one main injector 16 (see FIG. 2), the first liquid fuel, which is relatively less ignitable, can be fed to the cylinders 12 in the first operating mode and the second liquid fuel, which is relatively less ignitable, in the second operating mode. Accordingly, FIG. 2 shows a main injector 16 of a cylinder 12. By way of this main injector 16, the first liquid fuel can be injected into the cylinder 12 in the first operating mode and the second liquid fuel into the cylinder 12 in the second operating mode. Although it is preferred for cost reasons to inject the first liquid fuel in the first operating mode and the second liquid fuel in the second operating mode into the respective cylinder 12 of the dual-fuel internal combustion engine via the same main injector 16, it is alternatively also possible that each cylinder 12 has a separate main injector for each of the two liquid fuels. The embodiment shown in FIG. 2, in which the same main injector 16 is utilized in the first operating mode for injecting the first liquid fuel and in the second operating mode for injecting the second liquid fuel into the respective cylinder however is preferred.

According to FIG. 2, the respective liquid fuel can be fed to the respective main injector 16 via a main pump 17, which accordingly delivers the first liquid fuel in the first operating mode and the second liquid fuel in the second operating mode in the direction of the respective main injector 16.

FIG. 1 shows a first fuel tank 18 for holding the first liquid fuel and a second fuel tank 19 for holding the second liquid fuel. The first fuel tank 18 can be coupled to the main pump 17 via a first fuel line 20 and the second fuel tank 19 via a second fuel line 21 namely by way of a shuttle valve 22.

In the first operating mode, the shuttle valve 22 couples the first fuel tank 18 or the first fuel line 20 to the main pump 17, in order to feed the first fuel 18 to the cylinders 12 of the dual-fuel internal combustion engine. In this first operating mode, the shuttle valve 22 disconnects the second fuel tank 19 from the main pump 17 of the main injection system.

In the second operating mode, by contrast, the shuttle valve 22 assumes a switching position in which the second fuel tank 19 is coupled to the main pump 17 via the second fuel line 22 in order to feed the second fuel to the cylinders 12 of the dual-fuel internal combustion engine 11 in the second operating mode. In this second operating mode, the first fuel tank 18 is then disconnected from the main pump 17 of the main injection system.

As already explained, the first liquid fuel is relatively highly ignitable and the second liquid fuel relatively less ignitable. In order to ignite the second liquid fuel in the second operating mode in the region of the respective cylinder 12, the dual-fuel internal combustion engine comprises the pilot injection system, which, for each cylinder 12 comprises at least one pilot injector 23.

By the pilot injection system, the first liquid fuel can be fed to the cylinders 12 of the dual-fuel internal combustion engine 11 in the second operating mode for igniting the second liquid fuel.

Accordingly, the pilot injection system comprises, in addition to the at least one pilot injector 23 for each cylinder 12, a pilot pump 24, via which the respective pilot injector 23 can then be supplied in the second operating mode with the first liquid fuel, emanating from the first fuel tank 18. From the first fuel tank 18 a further fuel line 27 extends in the direction of the cylinders 12, wherein the pilot pump 24 is connected into this further fuel line 27.

In the dual-fuel internal combustion engine 11 according to the invention, the main injection system and the pilot injection system are coupled, as is evident from FIG. 2, namely such that the first liquid fuel can be fed to the respective main injector 16 of the main injection system in the second operating mode emanating from the pilot injection system, which for each cylinder 12 comprises the at least one pilot injector 23 and the pilot pump 24, wherein the first liquid fuel in the second operating mode serves as working fluid and/or barrier fluid in the region of the respective main injector 16.

Accordingly, FIG. 2 shows a branch line 25 which branches off the pilot injection system upstream of the respective pilot injector 23 and preferentially leads directly to the respective main injector 16 of the main injection system of the respective cylinder 12 and opens into the main injection system preferentially in the region of the respective main injector 16. Here, the branch line 25, seen in the delivery direction of the pilot injection system, branches off the pilot injection system downstream of the pilot pump 24 and upstream of the respective pilot injector 23 so as to feed the first liquid fuel in the second operating mode to the respective main injector 16 of the main injection system as working fluid and/or barrier fluid.

In the second operating mode, there is a pressure in the respective branch line 25 leading from the pilot injection system to the main injection system that is greater than the pressure in the region of the respective main injector 16, preferentially by a defined pressure offset. This ensures, in the second operating mode, that the first liquid fuel can always be reliably fed to the respective main injector 16.

In FIG. 2, a pressure reducer 26 is integrated in the branch line 25 shown there. The pressure reducer 26 limits the pressure in the respective branch line 25 downstream of the pressure reducer 26 to a defined level.

The first liquid fuel, which is highly ignitable, is preferentially a liquid fuel which preferentially has a lubricity WSD between 100 µm and 300 µm, particularly advantageously between 100 µm and 200 µm. The second liquid fuel, which is relatively less ignitable, is preferentially a liquid fuel which preferentially has a lubricity WSD between 300 µm and 820 µm, particularly advantageously between 400 µm and 820 µm. The first liquid fuel is preferentially a diesel fuel. The second liquid fuel is preferentially ethanol or methanol.

In the dual-fuel internal combustion engine 11 according to an aspect of the invention, which in both operating modes combusts a liquid fuel each, the first liquid fuel in the second operating mode serves on the one hand for igniting the second liquid fuel and on the other hand as working fluid and/or barrier fluid in the region of the respective main injector 16. Accordingly, in the second operating mode, main injector 16 and pilot injector 23 of the respective cylinder 12 utilize the first liquid fuel as ignition oil on the one hand, which is introduced into the cylinder 12 via the respective pilot injector 23, and on the other hand as working oil and/or barrier oil in the region of the main injector 16.

This relates in particular to the field of so-called large engines or large internal combustion engines, whose cylinders have piston diameters of at least 140 mm, in particular of at least 175 mm. Such large internal combustion engines are for example marine engines. In the invention, these are embodied as dual-fuel internal combustion engines.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

LIST OF REFERENCE NUMBERS

10 Ship propulsion system
11 Dual-fuel internal combustion engine
12 Cylinder
13 Generator
14 Ship propeller
15 Fuel supply system
16 Main injector
17 Main pump
18 Fuel tank
19 Fuel tank
20 Fuel line
21 Fuel line
22 Shuttle valve
23 Pilot injector
24 Pilot pump
25 Branch line
26 Pressure reducer
27 Fuel line

We claim:

1. A dual-fuel internal combustion engine (11), comprising:
   a plurality of cylinders (12), each of the plurality of cylinders being configured to combust a first liquid fuel having a first ignitability in a first operating mode, and to combust a second liquid fuel having a second ignitability, less than that of the first liquid fuel, in a second operating mode;
   a main injection system comprising at least one main injector (16) for each of the plurality of cylinders (12), via which the first liquid fuel is feedable to the respective cylinders (12) in the first operating mode and via which the second liquid fuel is feedable to the respective cylinders (12) in the second operating mode; and
   a pilot injection system comprising at least one pilot injector (23) for each of the plurality of cylinders (12), via which the first liquid fuel can is feedable to the respective cylinders (12) in the second operating mode for igniting the second liquid fuel,
   wherein the main injection system and the pilot injection system are coupled such that in the second operating mode the first liquid fuel, emanating from the pilot injection system, is feedable to the respective at least one main injector (16) as at least one selected from the group consisting of a working fluid and barrier fluid.

2. The dual-fuel internal combustion engine according to claim 1,
   further comprising, upstream of the respective pilot injector (23), a respective branch line (25) that branches off the pilot injection system, via which respective branch line (25) in the second operating mode the first liquid fuel is feedable to the respective main injector (16) as the at least one selected from the group consisting of a working fluid and barrier fluid.

3. The dual-fuel internal combustion engine according to claim 2, wherein the respective branch line (25) opens into the main injection system at the respective main injector (16).

4. The dual-fuel internal combustion engine according to claim 3, further comprising a pressure reducer (26) integrated into the respective branch line (25) and configured to limit the pressure in the respective branch line (25).

5. The dual-fuel internal combustion engine according to claim 4, wherein in the second operating mode a pressure in the respective branch line (25) leading from the pilot injection system to the main injection system is greater than a pressure at the respective main injector (16) of the main injection system.

6. The dual-fuel internal combustion engine according to claim 1, wherein:
   the main injection system further comprises a main pump (17), via which main pump (17) in the first operating mode the first liquid fuel is feedable to the cylinders (12) and, via which main pump (17) in the second operating mode, the second liquid fuel is feedable to the cylinders (12), and
   the pilot injection system further comprises a pilot pump (24), via which pilot pump (24) in the second operating mode the first liquid fuel is feedable to the cylinders (12) for igniting the second liquid fuel.

7. The dual-fuel internal combustion engine according to claim 6, further comprising:
- a first fuel tank (18) configured to store the first liquid fuel, wherein the first fuel tank (18) is configured to be coupleable to the main pump (17) via a first fuel line (20),
- a second fuel tank (19) configured to store the second liquid fuel, wherein the second fuel tank (19) is configured to be coupleable to the main pump (17) via a second fuel line (21), and
- a shuttle valve (22) configured to couple, in the first operating mode, the main pump (17) to the first fuel tank (18) via the first fuel line (20), and to couple, in the second operating mode, the main pump (17) to the second fuel tank (19) via the second fuel line (21).

8. The dual-fuel internal combustion engine according to claim 2, wherein the respective branch line (25) branches off the pilot injection system upstream of the respective pilot injector (23) and downstream of the pilot pump (24).

9. The dual-fuel internal combustion engine according to claim 1, wherein the first liquid fuel has a lubricity WSD between 100 μm and 300 μm, or between 100 μm and 200 μm, and wherein the second liquid fuel has a lubricity WSD between 300 μm and 820 μm, or between 400 μm and 820 μm.

10. The dual-fuel internal combustion engine according to claim 1, wherein the first liquid fuel is a diesel fuel, and wherein the second liquid fuel is ethanol or methanol.

11. The dual-fuel internal combustion engine according to claim 6, wherein the respective branch line (25) branches off the pilot injection system upstream of the respective pilot injector (23) and downstream of the pilot pump (24).

* * * * *